May 18, 1965    R. C. O'BRIEN ETAL    3,183,806

PHOTOGRAPHIC TYPE COMPOSITION

Filed June 15, 1961    4 Sheets-Sheet 1

INVENTORS
RICHARD C. O'BRIEN,
BY  RALPH A. PROUD, JR.
    FRANCIS HUNSTIGER
*Maurice Biebel, French & Bugg*
ATTORNEYS

United States Patent Office 3,183,806
Patented May 18, 1965

3,183,806
PHOTOGRAPHIC TYPE COMPOSITION
Richard C. O'Brien, Ralph A. Proud, Jr., and Francis Hunstiger, Cleveland, Ohio, assignors to Harris-Intertype Corporation, Cleveland, Ohio, a corporation of Delaware
Filed June 15, 1961, Ser. No. 117,454
12 Claims. (Cl. 95—4.5)

This invention relates to photographic type composition, and particularly to film handling equipment or high speed photographic type composing machines.

In apparatus of the type with which the present invention is particularly concerned, the composition is controlled by a previously prepared record, such as a punch tape or the like, and this record includes data identifying characters in predetermined succession to make up a line of composition, including space between words and suitable justification data from which the apparatus may compute the necessary adjustment of such interword spaces to achieve justification of the line at a predetermined standard length. Thus, operating from such a record, the apparatus projects successively light beam bearing images of the different characters in the order of selection, and the images are optically sized to the desired enlargement or reduction with respect to the master characters which form the object or objects of the photographic operation.

The character images are preferably focused in a common plane, and projected along a common substantially fixed path. Photographic material, such as a sheet or portion of a roll of photographic film is supported in the image plane and relative motion is caused between the film and the path along which the character images are projected, in correlated relation to the projection of each successive character image, and through a spaced distance which corresponds to the actual space alloted in the line of composition to the corresponding character.

Machines of this type are capable of operating at relatively high speeds, for example projecting up to 60 characters per second, and thus the spacing operation, such as by moving the photographic film, must proceed rapidly, with extreme acceleration and decelerations in a start-stop distance of this kind. On the other hand, the movements of the film must be absolutely precise, for example in one system in accordance with the invention the film must be moved in precise increments of 1/64 of a pica (approximately 0.0026 inch) or precise multiples thereof, and this spacing must be accomplished within time intervals in the order of 1/500 of a second. It is necessary, therefore, that the apparatus for controlling film movement be capable of maintataining the film precisely in position in the photographic station, where the character images are recorded, and also that the moving parts of the adjustment be as light in weight as possible, to minimize the acceleration and deceleration forces involved and thus to enable the use of high speed light weight driving and controlling equipment which can produce the necessary accuracy or quality type setting operations.

Accordingly, the primary object of this invention is to provide novel film handling and control equipment for high speed photographic setting apparatus wherein the photographic film is moved in predetermined increments, in a stop-start system, to achieve the necessary spacing for characters and interword spaces in lines of composition.

Another object of this invention is to provide novel film handling equipment of this type wherein only the necessary portions of the photograph film or light sensitive recording material are moved during the spacing operation in recording a line of composition.

Another object of this invention is to provide suitable film controlling apparatus of the above mentioned type wherein the smallest increment of spacing movement may be accomplished independently of movement of the photographic material, thereby reducing the speed requirements for the film controlling equipment.

A further object of this invention is to provide a novel spacing drive and control for phototypesetting apparatus, wherein the drive includes a transducer in the nature of a stepping motor arranged to step through predetermined increments, or multiples thereof, in response to digital spacing information transmitted to the stepping motor as discrete electrical pulses.

A further object of the invention is to provide such a spacing control for phototypesetting apparatus wherein the relative spacing movement between the character projecting parts and the recording parts, such a support for photosensitive material, is accomplished by a direct drive from a high speed electrical stepping motor which at all times maintains the desired relative position between these parts and combines the function of a spacing drive and a precise position control or brake in one unit capable of extremely high speed operation, for example approximately 300 spacing increments per second.

Other objects and advantages of the invention will be apparent from the following description, the accompanying drawing and the appended claims.

Figure 1:
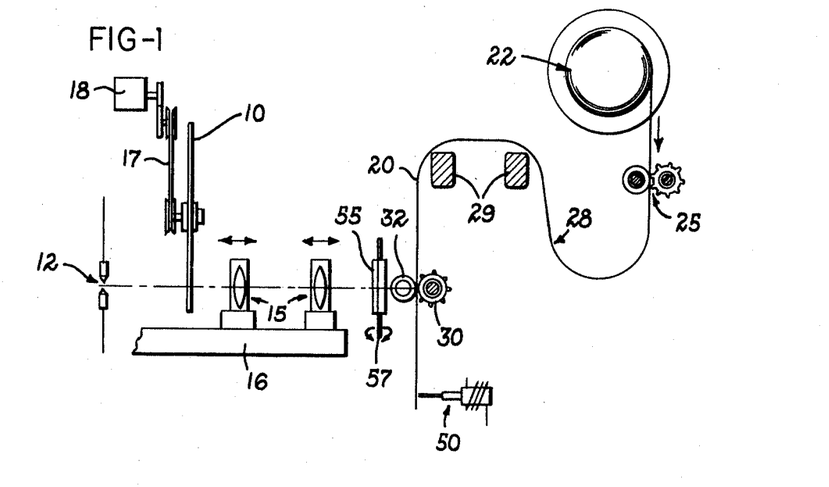
FIG. 1 is a schematic representation of portions of a phototypesetting apparatus in accordance with the invention.
Figure 8:
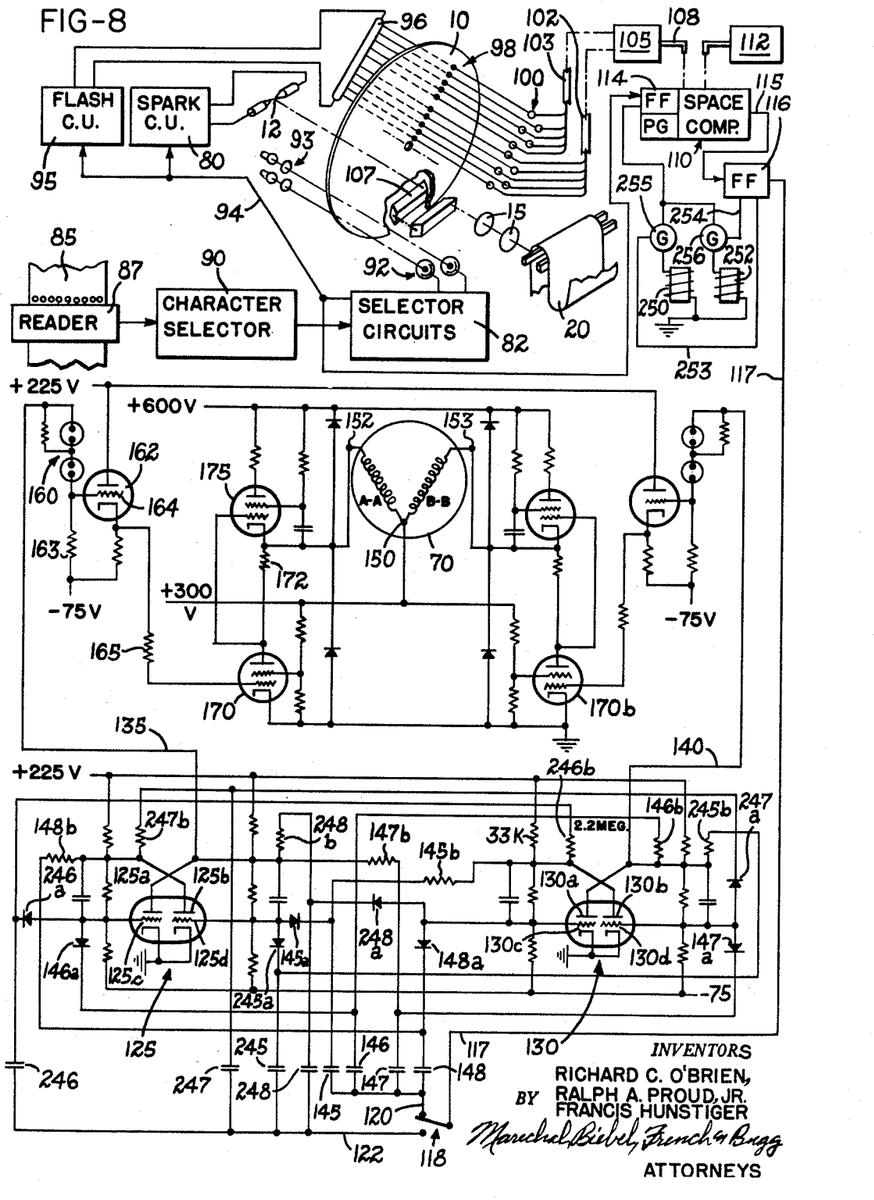
FIG. 8 is a diagrammatic showing of the controls for the stepping motor, including schematic representations of portions of the character projecting apparatus, and showing in block diagram selector and control units of conventional construction.

Referring to the drawings, which illustrate a preferred embodiment of the invention, and particularly with reference to FIGS. 1 and 8, the basic elements of a photographic type composing machine with which the present invention is particularly concerned are shown in schematic form. These parts include a master character carrier or matrix 10 from which are selected the character to be reproduced in the desired succession to form lines of composition. One typical system of this type includes a flash source of light shown schematically as the electrodes 12 across which a spark may be produced forming an instantaneous high intensity source of light which will pass through a selected character on the font disk and through the optical system, as defined by the movable lenses 15 which are supported in carriers and adjustably mounted on a base 16. The individual characters on the carrier or disk 10 may be moved successively past the light source and the axis of the optical sytsem by rotating the disk through a drive belt 17 which is in turn powered from a suitable motor shown schematically at 18.

*Film control*

Figure 2:
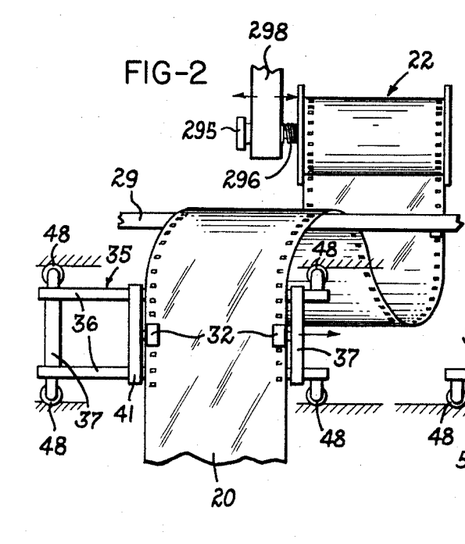
FIGS. 2 and 3 are somewhat schematic diagrams, similar to each other, and illustrating the manner in which the photosensitive material or film is handled and moved during composition of a line.
Figure 3:
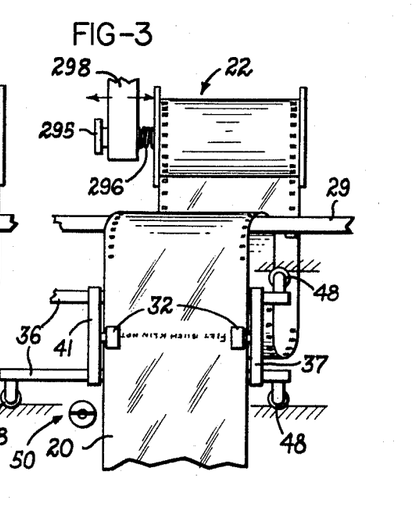

The resultant beams of light bearing individual selected character images, of a size determined by the setting of the lenses 15, are directed onto photosensitive material 20 which may be in the form of a strip of photographic film supplied from a roll 22 thereof. The film is paid out from the roll by feeder mechanism 25, the details of which are described hereafter, and the film thence passes through a loop formation 28 which is maintained by the feeder mechanism, and over the cross members 29 of the supporting framework of the machine and downwardly through film control sprockets 30 which engage within perforations on the edges of the film (as shown in FIGS. 2 and 3) and against which the film is maintained by suitable preloaded backup rollers 32.

Figures 4, 5, 6:
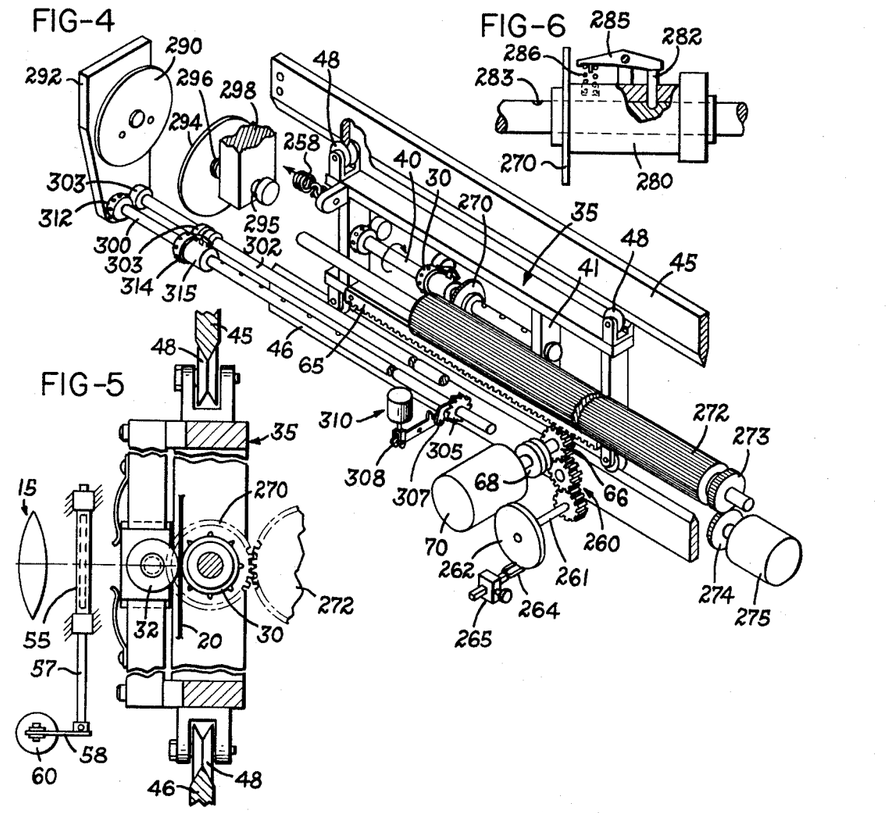
FIG. 4 is a perspective view, with some parts broken and in section, showing the essential elements of the film controlling feed and spacing carriage.
FIG. 5 is a sectional view taken generally through the center of FIG. 4, and showing the relationship of parts of the carriage drive with the optical spacing elements and character image size control systems.
FIG. 6 is a detail view on an enlarged scale, with parts broken away and shown in section, of an adjustable sprocket in the film feed and control devices, adaptable to accommodate photosensitive material of different widths.

Thus, the sprockets 30 engage opposite edges of the film and provide a means which maintains a band of film rigid in a transverse direction, such band being located across the photographic station at which the image bearing light beams are directed. These sprockets and their corresponding back-up rolls 32 are mounted on a lightweight control carriage 35 including upper and lower rails 36 joined by end rails 37, one of which provides a mounting for the sprocket control and mounting shaft 40 (FIG. 4). The other end of this shaft is journaled in a separate carriage cross member 41.

Above and below the carriage are guide and mounting rails 45 and 46, respectively, and at each corner of the carriage there is mounted a roller wheel 48 engaging with the appropriate rail. These rails and wheels preferably are a complementary V and groove configuration providing for precise alignment of the roller wheels, and thus of the carriage, such that the carriage is guided for transverse movement with respect to the optical system of the machine in a plane which is preferably exactly normal to the longitudinal axis of the optical system along which the character image bearing light beams are directed.

Therefore, the carriage 35 maintains the photosensitive material such as the film 20 precisely rigid and in proper position for recording of the projected character images, but only the band of the film traversing the photographic position is thus maintained. That portion of the film between the roll 22 and the sprockets 30, including the loop portion 28 is maintained in a relatively slack condition, and the carriage can move, displacing the film with it, while the supply roll 22 and feeder mechanism 25 remains stationary. The exposed portions of the film pass away beneath the sprockets 30 and may be gathered at any suitable point, for example the film may be cut off by a power knife 50 at some station beneath the carriage, dividing the exposed film into desired pieces such as to make up a page of composition, or several pages, or the like.

Accordingly, carriage 35 provides a precise positioning control for the photosensitive material, but does not need to provide any heavy mounting structure or the like, and the entire carriage construction, including cross pieces, bearings, etc., may be of very light weight. This substantially reduces the inertia forces imposed upon the spacing mechanism, and such a lightweight carriage can be positioned precisely and at very high speed. For example, in practice a carriage so constructed, capable of handling film up to 9 inches in width, and weighing approximately one pound (total weight for all moving structure of the carriage), has been repeatedly moved through spacing increments of $\frac{1}{32}$ of a pica, or 0.0052 inch, or precise multiples thereof at rates of approximately 300 per second.

For purposes of finer spacing control movement a refracting or light displacing member 55, as in the form of an optical flat, is mounted for rotation on a shaft 57, and may be movable between two alternate positions through manipulation of a lever 58 by a pneumatic cylinder drive 60 (FIG. 5) to displace the light beams on the photographic material through a fine adjustment, to obtain spacing movements of projected character images in the order of $\frac{1}{64}$ of a pica. Coordination of the carriage movement drive with actuation of the pneumatic cylinder 60 thus will provide a complete range of spacing movement at extremely high speeds, as noted, within precise increments of as little as $\frac{1}{64}$ of a pica.

An important feature of this invention is the drive and control for character spacing movement. Such movement is defined broadly as relative movement between the position in the character image plane at which images of all characters are focused in succession according to the predetermined composition, and the recording medium for the characters which may be for example photographic film or the like. It is of course possible to provide for movement of the character images along the film while maintaining the film stationary, or to move the film while maintaining the character image position essentially stationary, or to provide for combination of such movements for the purpose of spacing in accordance with the character image widths. The invention is disclosed particularly with regard to such combination of spacing movement producing devices, but as will be explained hereafter, the present invention is not limited to any one of such spacing movement producing systems, and it should be understood that the principles involved herein can be applied to any of such arrangements as broadly described above.

*Stepping motor*

For controlling the movement of the carriage 35, and thus the movement of the film 20 held therein, in a direction to space the character images across the film during composition of a line, the carriage is provided with a rack 65 fastened thereto and meshing with a pinion 66. This pinion is driven through a positive clutch 68 (such as a jaw clutch) by the space controlling stepping motor 70. This stepping motor is preferably of a type having a magnetically polarized rotor 72 (FIG. 7) and a stator 73 having a plurality of coils which provide at least two different phases. For purposes of illustration, the motor is shown and described as having a 5-tooth rotor 72 including teeth 72a–e, and a 4-coil stator providing phases 73A and 73B. It will be understood that the coils 73A and 73B are respectively in series circuit and provide one phase or winding of the stator. In practice a motor of this type may actually have considerably more coils, for example eight, and considerably more teeth in the rotor as desired to provide more stepping increments per revolution. The same principles of operation apply, however.

Figure 7:
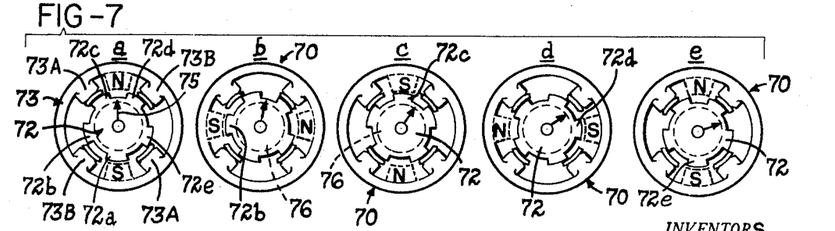
FIG. 7 is a diagrammatic showing, including separate views a through e, illustrating the operation of a preferred type of stepping motor used with the present invention.
Figure 9:
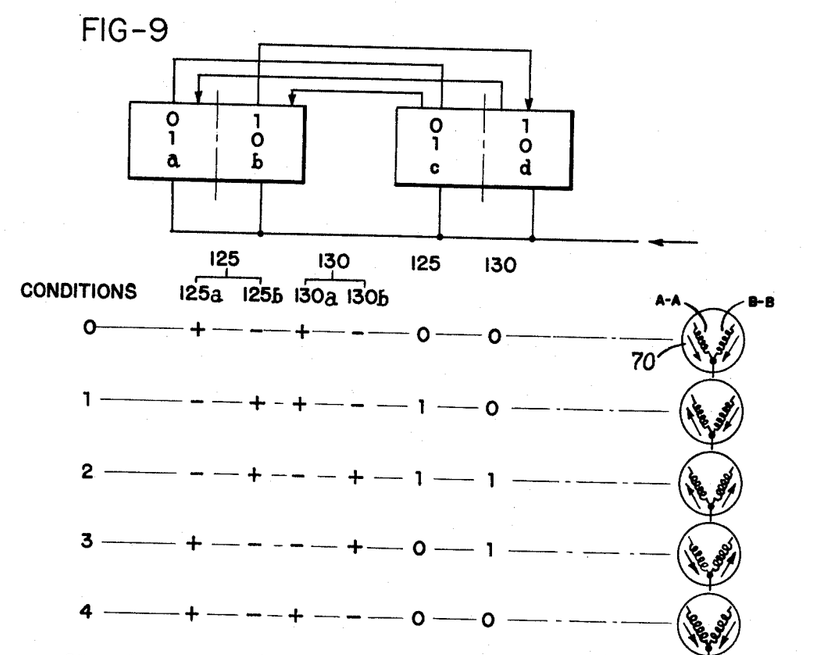
FIG. 9 is a diagram illustrating the operation of the stepping motor and its control, for explanation of the manner in which the motor is confined to stepping operation only in a predetermined direction.

Progressive step-wise movement or rotation of the rotor 72 is provided by changing the flow of current through the phase windings of the motor, and such progressive change is illustrated in FIG. 9, in the five schematic showings of the windings of the motor, with the arrows adjacent to the coil illustrations indicating the flow of current for a particular position. There are four possible conditions, as shown, it being noted that conditions "0" and "4" are the same to illustrate a complete stepping sequence. With the current flow as shown in condition zero, there is effectively a North pole at the top of the stator and a South pole at the bottom, indicated by the leters N and S in FIG. 7a. The position of the rotor at this time is indicated by the indexing arrow 75.

The rotor is constructed of a plurality of toothed members forming a sandwich with a permanent magnet 76, thus there are two rotor pieces 72, each having teeth 72a through e, and the teeth on each piece are off-set or out of phase such that the teeth in one are opposite slots in the other rotor piece. The permanent magnet causes the rotor pieces to be magnetically polarized such that one is a North pole and the other a South pole. For purposes of explanation it will be assumed that the rotor piece 72 shown in FIG. 7 is the North pole, and thus in FIG. 7a the tooth 72a is aligned with the South pole.

Reversing the flow of current through phase A—A will shift the magnetic field 90° clockwise, and the rotor will advance one-quarter tooth in that direction, with the tooth 72b moving into alignment with the effective South pole S as shown in FIG. 7b. Next, as in condition two on FIG. 9, the reversal of current flow through phase B—B will shift the magnetic field another 90° clockwise, and tooth 72c will align with the effective South pole. In the next condition (3 in FIG. 9) the flow of current through phase A—A is changed back to its initial direction, and this causes a further 90° shift of the magnetic field in the clockwise direction, as shown in FIG. 7d, the rotor shifts a one-quarter tooth clockwise, and the tooth 72d aligns with the effective South pole in this condition. Finally, restoring phase B—B to its initial condition brings the magnetic field back to the same condition as at the start (note that in FIGS. 7a and 7e the effective poles are the same), and rotor tooth 72e is aligned with the South pole at the bottom of the stator.

Accordingly, by systematically changing the current flow alternately through the windings of the stepping motor, it is possible to advance the rotor 72 in precise increments of fractions of a revolution, as explained. In each condition, until such time as the current flow is changed in one of the phases of the motor, the rotor is locked magnetically in an exact position.

Stepping control

The controls for producing such predetermined incremental movement of the stepping motor are shown in FIG. 8, together with pertinent sections of the photocomposing apparatus. The matrix disk 10 is rotated continuously, as previously explained, and the flashing light source, in the form of spark unit 12, is controlled by the spark control unit 80 which is in turn controlled from conventional selector circuits 82.

Apparatus in accordance with this invention may be operated from a perforated tape or the like 85 which is prepared with information necessary to control the composition of lines. A reading device 87 is arranged to read the information from tape 85 and to direct this information to a character selection control 90 which in turn is connected into the selector circuits 82. The character selector 90 will thus set up a code representing a selected character as read from the tape 85, and this information will be fed into selector circuits 82, which also have inputs from the selector photocells 92.

These photocells are arranged to receive light impluses from the light sources 93 in a coded fashion representative of the position of each character on the disk 10, and thus when the selector circuits ascertain a coincidence between the information received from the selector 90 and the position of the desired character in line with the spark unit 12, an initiating impulse will be transmitted through line 94 to the spark control unit for producing a flash of light to illuminate the selected character. Details of a suitable system of this type are disclosed in United States Patent 2,944,472, issued July 12, 1960, to the assignee of this application.

At the same time, a pulse will be transmitted through line 94 to a flash control unit 95 which will cause a gas discharge tube 96 to flash and thus to transmit light through one or more code dot transparencies in one or more of the positions 98 on disk 10. These code dots are in particular zones on the disk related to the selected character, and represent in a binary code system the relative width of that character with reference to the widths of other characters on the matrix.

Therefore, at the same time a character image is projected onto the film 20, light from tube 96 will pass through the space code dots appropriate to the projected image, and light will pass to selected ones of a bank of photocells 100 causing one or more of these photocells to transmit a pulse in accordance with the space width code for the selected character. In the illustration shown in FIG. 8 there are two sets of photocell banks and two separate sets of space code groups, and the outputs from each bank of photocells are transmitted separately through cables 102 and 103 to a font selector control 105, which also will govern the positioning of a font selection reflecting apparatus 107 which functions to direct light from spark unit 12 through a particular character in a selected font on disk 10.

Details of such font selection apparatus are disclosed in the copending application of Richard C. O'Brien, Serial No. 39,859, filed June 30, 1960, now U.S. Patent No. 3,099,945, and issued to the assignee of this application. For purposes of the present invention, it will be sufficient to understand that font selection information is provided to position the reflecting apparatus 107 for a desired font, and the selection switch appartus 105 is operated accordingly to direct space code information from one or the other of cables 102 or 103 through an input cable 108 to the character space computer 110.

The space computer is arranged to multiply the relative or unit width space information received from the photocell bank by a point set factor which is supplied to the computer 110 by a point set control 112 through a transmission cable 113. Details of a suitable space computer and point set control are fully described in United States Patent No. 2,846,932. Included in computer is a pulse generator PG and a control flip-flop 114 which receives a starting pulse to initiate operation of the pulse generator and thus start a computing operation. Thus, the output line 115 from computer 110 will transmit a number of pulses in accordance with the actual spacing to be alloted to a photographed character immediately after photography of the individual selected character has occurred. These pulses are directed through output line 115 to a divider flip-flop or binary 116, and this binary divides by two the number of input pulses and transmits the quotient, or half the number of pulses from computer 110, through line 117 which terminates at a single-pole double-throw selector switch 118, and thus the aforementioned apparatus provides a means for generating and supplying digital spacing information for each character image during the time interval between recording of the preceding and succeeding character images.

Switch 118 may be manipulated to direct the incoming space information pulses to one of two input circuit lines 120 or 122. Each of these lines is tied through steering circuits, which will presently be described, to a pair of binary or flip-flop circuits 125 and 130, respectively. These flip-flop circuits are basically the conventional Eccles-Jordan type of circuit, and may include dual triodes (for example type 5963) in combination with the bi-stable divider networks, to provide alternate conduction of one side or the other of each dual triode in the usual manner. Thus, each flip-flop will remain in a "0" or "1" condition, in accordance with the usual practice, until a pulse is directed into the circuit to disturb its static or stable condition.

For purposes of explanation it will be assumed that when the binary 125 is in the "0" condition the right hand side of the dual triode (plate 125b) will be conducting, and in the "1" condition, the left hand side will conduct, the plate 125a will be at a relatively negative potential. This latter condition will produce a negative output signal in the line 135 which is connected directly into the circuit of plate 125a. Similarly, when binary 130 is in the "1" condition plate 130a will be relatively negative, the left hand side of this tube will conduct, and output line 140 which is tied to plate 130a will be at a negative potential, whereas in the "0" condition plate 130b will be negative, and the other side of the tube will be cut off, with plate 130a then going to a substantially high positive potential due to its connection to the +225 v. supply through the plate resistor.

The switching of the binaries 125 and 130 is caused by directing a negative pulse from the input circuit line 120 through condensers 145, 146, 147 and 148. The condenser 146 is connected to the right hand grid 125c of the binary 125 through a diode 146a, and also through a 2.2 meg. resistor 146b to the plate 130a of binary 130. Similarly, condenser 145 is connected through diode 145a to grid 125d of binary 125 and through resistor 145b to plate 130b of binary 130. The input condenser 148 is connected through diode 148a to grid 130c, and through resistor 148b (also 2.2 meg.) to plate 125b. Finally, condenser 147 is connected through diode 147a to grid 130d of binary 130, and through resistor 147b to plate 125a of binary 125. These diode and resistor circuits provide steering interconnections between the binaries which maintain them always in phase with respect to the input pulses received. The condensers may be all 270 pfd., the steering resistors 2.2 meg., and the diodes type 1 N 2070.

As a starting point in explaining the operation of this circuit, it will be assumed that both binaries are in the "0" condition, thus plate 125b will be at a relatively negative potential, as will be plate 130b, whereas the plates 125a and 130a will be at a relatively high potential, the left hand sides of these tubes being cut off. This is the "0" condition in the chart portion of FIG. 9. The first pulse received through input line 120 will cause shifting pulses to be transmitted by condenser 145 and condenser 148. Condenser 146 is tied through resistor 146b to plate 130a, which is at the higher potential, and will prevent the negative shift pulse from being effective upon grid 125c. Similarly, condenser 147 is connected to the then positive plate 125a and will prevent an effective shift pulse being transmitted to the grid 130d. The net result of the first input pulse is that binary 125 will shift to its "1" condition, while binary 130 will remain unchanged.

The next input pulse will result in negative pulses to grids 125d and 130d. Grid 125d is already at a negative potential, since binary 125 is then in its "1" or "flopped" state, so there will be no effect upon this binary. Grid 130d is receptive to the negative pulse, which cuts off this side of the binary and causes the binary to shift, with plate 130a now becoming relatively negative, and plate 130b positive or at its higher potential. It will be noted that plate 130a is connected through resistor 146 and diode 146a to grid 145c. However, this resistor provides a delay with respect to the shifting pulse, and the potentials are so arranged that it is not effective to cut off the left hand side of binary 125, which is then conducting. As a result, both binaries are shifted after the second input pulse to their "flopped" or "1" states.

The third input pulse will thus be directed only to grids 125c and 130d. Grid 135d is already negative, so there will be no-change in binary 130. Grid 125c is drawn negative to cut off this side of the tube, and the binary 125 reverts to its "0" state, while binary 130 remains in its "1" state. Finally, the fourth incoming pulse will be effective upon grids 125c and 130c. The former is already negative, and therefore no change results in binary 125, while grid 130c becomes negative and causes binary 130 to revert to its "0" state, and thus after four input pulses the binaries are again in the same state as initially, both "0." The sequence is illustrated in the chart portion of FIG. 9.

The stepping motor 70 has its common stator winding connection 130 connected to a +300 v. supply line. The other connections to the windings A—A and B—B, connections 152 and 153 respectively, are arranged for selective connection to a +600 v. supply line through a gating circuit control which may be used to control the flow of current through the separate phase windings of the stepping motor. The plate voltages of the flip-flops 125 and 130 will alternate between states, in the particular circuit illustrated between +40 and +185 v. Therefore, when binary 125 is in its "0" state the potential in line 135 will be approximately +185 v., and this positive potential is applied to a pair of series connected neon tubes 160 which are in turn connected to the grid of a control triode 162, and through the resistor 163 to a —75 v. line. When line 135 is at this higher potential current will flow through the neon tubes 160 sufficient to overcome the grid bias resistor 163 and bring the grid 164 to a relatively positive potential, causing the triode 162 to conduct. Thus, through the cathode follower connection, including resistor 165, a positive potential is applied to the control grid of the gate tube 170, causing it to conduct. This will in turn bring the control grid of the main control gate tube 175 to a relatively negative potential with respect to its cathode, and this tube will be cut off, with the flow of current proceeding from ground through tube 170 and resistor 172, through the winding B—B and connection 153, and through the connection 150 to the +300 v. line.

Conversely, when the binary 125 changes to its "1" state the potential in line 135 will drop, in the circuit illustrated to about +40 v. This will be insufficient to produce a flow of current through the neon tube network 160, and the binary will be effectively isolated from the motor control circuit. Grid 164 will be biased negative through resistor 163 connecting to the —75 v. source, and thus tube 162 will be cut off, and the cathode follower circuit will drop to a negative potential cutting off tube 170. With tube 170 cut off, the gate tube 175 conducts and current flows from the 300 v. line through winding A—A and from connection 152 through tube 175 to the +600 v. line. Therefore, the flow of current in the winding A—A will reverse at high speed in accordance with the state of binary 125. A potential difference of 300 v. is applied momentarily across the winding, substantially in excess of the normal operating voltage of the motor, and causing the motor to step accordingly, in the manner previously explained. The circuit constants (i.e., the plate circuit resistors, etc.) are such that the standing potential across the motor is reduced to about 35 v., well within its continuous rating.

Similarly, the potential of line 140 will be changed in accordance with the state of binary 130. This control line is also connected into an identical control circuit which is coupled across the motor winding B—B. Accordingly, the same reference numerals have been applied to the right hand side of the motor control circuit with the suffix b to designate that these parts control the winding B—B. The change of current flow in the phase windings of the stepping motor will proceed as illustrated in FIG. 9. Under the heading "conditions" there are five conditions represented, from the initial or "0" pulse beginning, to the condition after four pulses have been received at the stepping motor input. It will be observed that condition "4" is the same as condition "0", and thus the sequence will repeat itself.

Assuming, as in the previous explanation, that in the initial condition each binary is in the "0" state, then the plates 125a and 125b will be respectively at higher and lower potentials, and this is designated by a plug sign for the higher potential and a negative sign for the lower, although it will be understood that in practice, and particularly in the circuit illustrated in FIG. 8, the lower potential may actually be a positive rather than a negative voltage. The corresponding states ("0" or "1") for the two binaries are likewise shown in the table, and to the right are illustrated the directions of current flow in the stepping motor phase windings corresponding to the various conditions. In the first condition plate 125a is at the higher potential and plate 125b lower, plate 130a at the higher potential and 130b lower, and thus the flow of current in each of windings A—A and B—B is from ground to the +300 v. line, in other words, tubes 170 and 170b are conducting.

At the first input pulse binary 125 changes state to "1," and the flow of current through winding A—A is reversed. The motor 70 advances one step as explained. At the second input pulse binary 130 changes state to "1" and the flow through winding B—B is reversed. The third pulse causes binary 125 to revert to its "0" state and the current flow through winding A—A is changed back again, and finally on the fourth pulse binary 130 returns to its "0" state and the current flow is reversed in winding B—B, returning to the initial condition. Therefore, for each input pulse received the stepping motor turns one step as previously explained.

An important feature of this circuitry is the interconnection of the two binaries in such a way that they must proceed in the pattern explained, changing state with respect to each other in accordance with input pulses. The binaries cannot get out of phase for any reason, since they are cross coupled in the manner described.

This arrangement has significant advantages over the conventional way of accomplishing such stepping control, using the complementary outputs from a main binary to control two other binaries each of which controls the current flow through a phase winding of the motor. With such a conventional arrangement it is possible for an extraneous pulse to cause one of the subordinate binaries to become out of phase, accidentally reversing the current flow in one of the phase windings and thus causing the motor to start in a backward direction when the spacing pulses are received. Also, in order to reverse such a conventional circuit it is necessary to introduce a reversing pulse into the main or controlling binary, and this will result in an extraneous pulse to one of the subordinate binaries which must be squelched, otherwise a spacing operation would occur when not desired.

Of course, it will be obvious to those skilled in the art that the binaries 125 and 130 (FIG. 8) can be cross-coupled in any desired manner to produce a corresponding sequential operation of the stepping motor. Therefore, considering the foregoing description as representing forward stepping movement in the spacing of characters, it is likewise possible to provide a cross-coupling circuit in which opposite or reverse stepping movement will be effected from pulses received through the same input line 117. There are a number of different reasons why such reverse spacing movement may be desired, for example, spot kerning spacings, back spacing beyond predetermined margins, etc. Whatever the reason may be, the present invention is capable of producing such reverse spacing movement without the introduction of any extraneous pulses which either require compensation or squelching, or in some other manner must be in effect overcome.

Accordingly, the reverse input line 122 from the switch 118 is connected to parallel circuits as follows. Condenser 245 is connected to direct a pulse from each input pulse received in line 122 through the diode 245a to the grid 125d, and at the same time this condenser is coupled through resistor 245b to the plate 130a. Thus, in this arrangement, grid 125d is cross-coupled with plate 130a, whereas in the "forward" circuit grid 125d was cross coupled to plate 130b.

Similarly, condenser 246 is connected through diode 246a to grid 125c, and cross-coupled through resistor 246b to plate 130b. Condenser 247 is connected through diode 247a to grid 130d and is cross coupled through resistor 247b to plate 125b. Finally, condenser 248 is connected through diode 248a to grid 130c, and is cross coupled through resistor 248b to plate 125a.

The stepping operation will proceed in essentially the same manner, although in a different pattern, as previously described. For example, assuming an initial conduction zero, as shown in FIG. 9, if the input pulses from line 117 are directed by switch 118 into the reverse input line 122, the net result of the first input pulse is to leave the binary 125 in its "0" condition and to change binary 130 to its "1" condition (the same as condition 3 in FIG. 9). Thus, the flow of current in the winding B—B is reversed, and the stepping motor turns one step in the opposite direction from which it would have turned in accordance with the previous explanation for forward operation. The stepping operation with the reverse cross coupling circuit operative is, therefore, exactly opposite to that shown in FIG. 9, with the motor stepping through conditions 4–3–2–1 to 0, reading upward in the diagram instead of downward.

Accordingly, as each code is read from tape 85 by the reader mechanism 87, either a function will occur (such as might require a back spacing operation or to change the font selection) or the selector circuits are activated to select a particular character from the matrix disk 10. If so, switch 118 will be actuated to its forward position and following selection of the character the relative space code will be read from the matrix disk, utilized by the space computer 110 to calculate the actual space to be occupied by the character image, and this actual space will be represented by a string or burst of pulses passing through line 115.

Spacing for expanding of character spaces, indentation, insertion of standard (non-justified) interword spaces, for spot kerning after the stepping control has been reversed, and for other desired purposes, is provided by assigning certain selection codes to segments of the matrix disk where there is no character on the disk. Thus, at such times the apparatus will go through a normal character selection and space computing operation, the light source and tube 96 will both flash, no character image will result, but the spacing control will function to produce the desired spacing operation.

As previously mentioned, it may be desirable to provide a light displacing member 55 for purposes of accomplishing the final stage of character spacing. By so doing, it is possible to reduce by one-half the speed requirements of the stepping motor, which are nevertheless quite high as previously explained, being in the order of 300 per second. This is accompanied by directing the pulses from the space computer output 115 through the binary or flip-flop 116 which will divide by two the computer output, and which can be connected to control the alternate energizing and deenergizing of solenoids 250 and 252 through connections 253 and 254, controlling the supply of pressure fluid to the pneumatic cylinder 60. In other words, each pulse from the space computer will produce a movement of the member 55, first in one direction and then in the next. The output from this binary will be one-half the number of pulses received from the space computer, and this output will be directed through line 117 to control the stepping motor as described.

In order to avoid having the solenoids 250 and 252 continuously alternately energize during a computing operation, the connections 253 and 254 are directed to gating amplifiers 255 and 256, and these "gates" are "closed," to prevent energization of the solenoids, by applying a negative potential through connections 253 and 254 derived from the computer control binary 114. Whenever the computer is "on," the gates 255 and 256 are "closed," and when the computer is stopped by its own last output pulse (as explained in said Patent No. 2,846,932) the potential supply to connections 253 and 254 becomes positive to "open" the gating amplifiers. At this time the appropriate one of solenoids 250 or 252 is energized depending upon the state of binary 116 at the end of the computing operation.

Once the stepping controls have advanced carriage 35 to the end of a line, the carriage is returned to its starting position by a return spring 258 (FIG. 4) which is connected to a fixed point on the frame (not shown). To accomplish this, an "end of line" signal is supplied to a suitable control for the clutch 68, causing this clutch to disengage and effectively disconnecting the motor 70 from the carriage. The spring thus will reutrn the carriage to its "beginning of the line" position.

The amount of such return movement will vary with the length of line being composed, the size of film on which photocomposition is being accomplished, and the speed of carriage return will vary accordingly and also perhaps from other factors such as the friction between the rollers 48 and the upper and lower rails 45 and 46. To avoid excessive acceleration of the carriage during its return movement, and thus undue deceleration forces on the carriage when it reaches its "beginning of line" position, a gear train 260 is connected with the carriage drive gear 66, and in turn is connected to the shaft 261 of an eddy current brake device including the disk 262 and permanent magnet 264 which is carried in an adjustable mounting 265. As is well known, the faster disk 262 is rotated, the more braking effect is produced by this type of device, and therefore, with such an arrangement a load resistance to return movement of the carriage is provided which will increase proportionately with any increase in carriage return speed. In practice, the eddy current brake is adjusted to give an essentially constant speed carriage return stroke.

*Leading control*

As the carriage returns to its "beginning of line" position, it is necessary to perform a line spacing function, commonly referred to in the art as leading. Leading control is provided herein by a pinion 270 carried on shaft 240 in the carriage, and meshing with an elongated gear or spline 272. The length of the spline will be determined by the required length to maintain mesh with gear 270 throughout the entire range of carriage movement.

Spline 272 is rotated by a gear 273 meshed with the output gear 274 of a further stepping motor 275. This motor, which is identified as the leading control motor, may be the same type of stepping motor as previously described herein, and preferably includes the same general type of stepping control. The high speeds of operation are just as important in leading control, even though the leading movement may be accomplished during the entire period of time during which the carriage is returned to its "beginning of line" position, a relatively long interval when compared to the time available for spacing of characters in a mesh of this type. This is so because the steps of movement required for leading are in many cases smaller of finer, and a great number of steps are required during each operation of the leading motor.

The controls are so arranged that the leading motor 275 operates during the return movement of the carriage 35, and the toothed clutch 68 is disengaged at this time, as noted previously. When the carriage is returned and prepared to advance for composition of the next line, this clutch must again be engaged. It is desirable, therefore, in order to avoid any movement of the carriage when the clutch engages, that the number of teeth in the clutch be equal to the number of different positions which the motor output can attain. In actual practice, it has been found that by restoring the phase relationship of the motor to the "0" condition (FIG. 9) the numuber of teeth required in the clutch is only one-quarter the total number of possible positions of the motor output. This is essentially a practical consideration which is of importance primarily in the manufacture of a clutch suitable for this purpose, but it should be recognized that such a requirement exists to assure maintaining the carriage stationary as the clutch is engaged.

Figure 10:
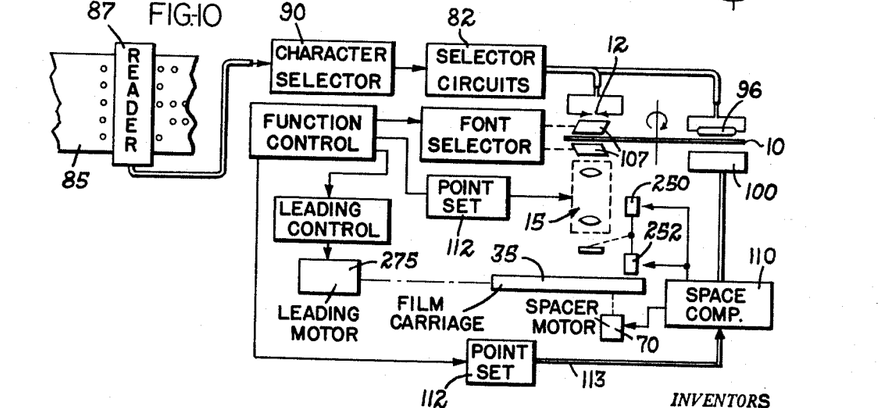
FIG. 10 is a block diagram illustrating the general relationship of the parts, including the apparatus shown in FIG. 8.

The leading control is also useful in spacing characters above or below the normal position in the line, as is the case with sub-scripts, super-scripts, and for similar placement of characters in an other than normal position in the line. This may be readily accomplished in accordance with this invention by providing a function code on tape 85 indicating a temporary leading change, and then by supplying to the leading motor stepping control 277 (FIG. 10) (which as explained is of the same nature as the spacing control) sufficient pulses to accomplish the desired operation of the leading control, and this will be in a "forward" or "reverse" direction according to the desired leading movement, for example reverse to locate a super-script, and forward to locate a sub-script. After this function, the leading motor is merely operated the same number of steps in the opposite direction to return to the normal location for following characters in the line.

Such a leading control is also particularly useful in forming "vertical rule" lines on the film. In many prior art photocomposing machines vertical rules are formed by spacing in from the margin, in successive lines, the same amount and exposing a vertical dash, with the dashes overlapping to result in a continuous vertical line. Experience with this type of control has shown, however, that in such an operation the resultant vertical line is quite often noticeably discontinuous, since even the slightest variation in the stepping control will produce a lateral displacement of some of the dashes with respect to those above or below. The result is a ragged vertical rule. A machine operating well within accepted limits of character spacing control is still often subject to this difficulty.

In accordance with this invention it is possible to form vertical rules by photographing a short vertical dash or line successively, but the film is moved only in a vertical direction (with reference to the lines of composition) by the leading motor. Thus, the proper indentation of the vertical rule is determined once, for the top of the rule, and then the film is advanced by the leading motor an amount equal to the vertical extent of the dash photographed, such that the successive dashes overlap to form a continuous line, but there is no lateral displacement of the carriage until the rule line is completed. It is possible in this manner to form a vertical rule which is completely free of apparent slight discrepancies in spacing as the rule extends through successive lines of composition. This technique can be accomplished at high speed with the stepping type of leading motor and control disclosed herein, and with accuracy well within acceptable limits.

*Film handling*

Apparatus of this type may be required to operate with different widths of photosensitive material, such as photographic film and the apparatus should be able to accommodate such material either in roll or sheet form. Accordingly, with reference to FIGS. 2, 3, 4 and 6, the film handling apparatus includes the sprockets 30, as previously explained, and while one of these sprockets is fixed to one end of shaft 40, the other sprocket is carried on a sleeve 280 which also carries the gear 270. This sleeve is mounted to slide along the shaft 40, and a detent is provided in the form of a pin 282 carried in sleeve 280, and receivable in several different detent depressions 283 formed at preselected positions along shaft 40. A detent holder is provided in the form of a pivotally mounted arm 285 on the sleeve which is pressed by spring 286 against the pin 282 to urge it into any one of the detent depressions selected. Accordingly, the location of the movable sprocket 30 can be determined with respect to the fixed sprocket according to the width of material being used.

The feeder mechanism for rolls of film is provided by a wheel 290 which is mounted to rotate on a fixed plate 292, and this wheel cooperates with a further wheel 294 to engage opposite ends of a roll of film, as shown in FIGS. 2 and 3. Wheel 294 is mounted on a shaft 295 which is spring loaded, by spring 296, to press against the roll of film. This shaft in turn is free to rotate to an adjustable arm 298, and the arm may be suspended at any convenient manner from the frame of the machine to accommodate movement thereof with respect to plate 292 according to the adjustment of sleeve 280.

As noted, the film passing from the roll supported between wheels 290 and 294 is directed to a feeder mechanism 25, and this mechanism maintains the loop formation 28 in the film passing to the carriage. The feeder mechanism is provided by parallel shafts 300 and 302. Shaft 302 is in the form of an idler shaft on which are mounted back-up rollers 303, one being located axially on the shaft, and the other being movable along the shaft to an adjusted position. The shaft 300 is the driving member of the feeder mechanism, and it is rotated by a ratchet wheel 305 (FIG. 4) which is engaged with a spring loaded pawl 307 on a rocker arm 308. This arm is rocked through a reciprocating motion by a driving motor 310, which may be in the form of a solenoid or an air cylinder, to advance the ratchet wheel 305 a predetermined number of teeth for each movement of the rocker arm. A fixed sprocket 312 is carried on shaft 300 to engage one side of the film, and a movable sprocket 314 is carried on a sleeve 315, mounted on shaft 300 and adjustable along the length thereof (together with the slidable roller 303) to accommodate different widths of film. The drive detent mechanism for sleeve 315 is of the same type as described in connection with sleeve 280, and shaft 300 is likewise provided with detent depressions at predetermined locations along its length, as shown in FIG. 4.

The feeder motor 310 can be pulsed or otherwise actuated by any suitable mechanism for sensing a predetermined advance rotation of the leading motor 275. The apparatus for such a sensing control is conventional, and may include a fixed contact cooperating with one or more movable contacts on gear 274 to actuate a control circuit upon a predetermined advancing rotation of the gear. In this manner, the feeder mechanism senses the rate at which the leading mechanism advances the film through the carriage, and is actuated accordingly to maintain the desired size of loop 28.

If sheets of photosensitive material are used, they can be inserted into the guiding and advancing mechanism (sprockets 20 and rollers 32) from above, and of course the feeder mechanism will be inoperative when such material is used.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In a phototypesetting apparatus having means for projecting character images of different widths along a common path and a means for mounting photosensitive record material in an image plane of said projecting means for recording the images to produce lines of composition, the combination of spacer means operative to cause spacing movement of said mounting means in said image plane with respect to said common path, a stepping motor having an output member directly mechanically connected to said spacer means, a position control member included in said motor and operative to change and to maintain the position of said output member in digital fashion solely through the application of an electrical force field on said output member, means generating digital spacing information for each character image representing a desired spacing movement in terms of a position change of said mounting means in relation to said common path, and circuit means responsive to such digital spacing information and connected to said position control member to change the direction of application of the force field in a predetermined sequence to operate said spacer means through predetermined spacing movement increments corresponding to the digital spacing information.

2. In a phototypesetting apparatus having means for projecting images of different characters of variable widths along a common optical path and means for recording the images in succession to form lines of composition, the combination of spacer means arranged to produce relative movement between the projecting means and the recording means to space successively projected character images with respect to each other, means for generating digital spacing information in the form of a number of pulses related to the space to be alloted to each character image during the time interval between recording of succeeding and following images, said spacer means including a transducer operative to move in incremental steps each corresponding to a pulse representing a digit of spacing information, and control circuits connecting said digital space generating means to said transducer to produce operation thereof in a number of steps corresponding to the digital spacing information for each character image.

3. In a phototypesetting apparatus having means for successively projecting character images of different widths along a comomn path and a means for mounting photosensitive record material in an image plane for recording the images to produce lines of composition, the combination of spacer means operative to cause relative spacing movement between said common path and said mounting means, a stepping motor having an output member directly mechanically connected to said spacer means and having a position control member operative to change and to maintain the position of said output member solely through the application of electrical force on said output member, means generating spacing information for each character image during the time interval between recording of the preceding and succeeding character images, circuit means directing such spacing information to said stepping motor to provide for operation of said spacer means according to the spacing information for each related character image, and circuits connected between said position control member and said spacer means operative to reverse the direction of electrical force and thus to reverse the direction of movement of said motor output member causing backward operation of said spacer means.

4. In a phototypesetting apparatus having means for successively projecting character images of different widths along a common path and a means for mounting photosensitive record material in an image plane for recording the images to produce lines of composition, the combination of spacer means operative to cause relative spacing movement between said common path and said mounting means, a stepping motor having an output member directly mechanically connected to said spacer means, a position control member incorporated in said motor operative to change and to maintain the position of said output member in digital fashion solely through the application of electrical force on said output member, means generating digital spacing information for each character image as a number of pulses related to the width of the character during the time interval between recording of the preceding and succeeding character images, and circuit means directing such digital spacing information to said position control member to operate said spacer means through predetermined spacing movement increments corresponding to the digital spacing information for each related character image.

5. In a phototypesetting apparatus having means for successively projecting character images of different widths along a common path and a means for mounting photosensitive record material in an image plane for recording the images in succession to produce lines of composition, the combination of spacer means operative to cause relative spacing movement between said common path and said mounting means, an electrical stepping motor having a polarized rotor, an output connection between said rotor and said spacer means, a control stator in said motor including means for creating an electrical force field movable one step at a time in response to a control pulse and operative on said polarized rotor to maintain precise positioning thereof and to move said rotor in precise stepped spacing increments, means generating digital spacing information for each character image in the form of a number of pulses corresponding to the width of such image during the time interval between recording of the preceding and succeeding character images, and circuit means directing such pulses to said control stator to provide for step-by-step spacing movement of said spacer means according to the spacing information for each related character image.

6. In a phototypesetting apparatus having means for successively projecting character images of different widths along a common path and a means for mounting photosensitive record material in an image plane for recording the images in succession to produce lines of composition, the combination of spacer means operative to cause relative spacing movement between said common path and said mounting means, an electrical stepping motor having a magnetically polarized rotor, an output connection between said rotor and said spacer means, a control stator in said motor including means for creating an electrical force field, circuit means connected to said field creating means for rotating the force field in a step-by-step manner to move said rotor in precise spacing increments and to maintain precise positioning of said rotor, means generating digital spacing information for each character image in the form of a number of pulses during the time interval between recording of the preceding and succeeding character images, and circuit means directing such spacing information pulses to said control stator to cause said rotor to drive said spacer means through a corresponding number of steps according to the spacing information for each related character image.

7. In a phototypesetting apparatus having means for successively projecting character images of different widths along a common path and a means for mounting photosensitive record material in an image plane of said projecting means to record the images producing lines of composition, the combination of spacer means operative to cause relative spacing movement between said common path and said mounting means for proper location of the successive characters in each line and for proper spacing of successive lines with respect to each other, said spacer means including a first stepping motor having an output member connected to cause relative movement between said projecting means and said mounting means in a direction along which the individual lines are composed, a position control member on said first motor operative to change and to maintain the position of its said output member in digital fashion solely through the application of electrical force on its said output member, means generating digital spacing information for each character during the time interval between recording of the preceding and succeeding character images, first circuit means directing said digital character spacing information to said first stepping motor to operate said spacer means through predetermined spacing increments corresponding to the digital spacing information for each related character image, a second stepping motor associated with said spacer means and having an output member connected to cause relative movement between said projecting means and said mounting means in a direction transverse to the character spacing direction producing leading spacing movement between lines and also effecting displacement of individual characters transversely to the line of composition, said second stepping motor including a position control member operative to change and to maintain the position of the output member of said second stepping motor in digital fashion solely through application of electrical force, means generating second digital spacing information representing a desired spacing movement of said second stepping motor, and circuit means directing such secondary spacing information to said second spacing motor to operate the same through predetermined spacing movement increments corresponding to such secondary spacing information.

8. In a phototypesetting apparatus having means for projecting character images of different widths along a common path and a means for mounting photosensitive record material in an image plane of said projecting means for recording the images to produce lines of composition, the combination of spacer means operative to cause relative spacing movement between said common path and said mounting means, a stepping motor having an output member mechanically connected to said spacer means, a positive control member included in said motor and operative to change the position of said output member in digital fashion solely through the application of electrical force on said output member, means generating digital spacing information representing a desired spacing movement in terms of a position change between said mounting means and said common path, circuit means directing such digital spacing information to said stepping motor to operate said spacer means through predetermined spacing movement increments corresponding to the digital spacing information, and a selectively operable connection between said circuit means and said motor controlling the direction of movement of said motor in response to such digital spacing information.

9. In a phototypesetting apparatus having means for projecting character images of different widths along a common path and a means for mounting photosensitive record material in an image plane of said projecting means for recording the images to produce lines of composition, the combination of spacer means operative to cause relative spacing movement between said common path and said mounting means, a stepping motor having an output member mechanically connected to said spacer means, a positive control member included in said motor and operative to change the position of said output member in digital fashion solely through the application of electrical force on said output member, means generating digital spacing information representing a desired spacing movement in terms of a position change between said mounting means and said common path, stepping control circuit means directing such digital spacing information to said stepping motor to operate said spacer means through predetermined spacing movement increments corresponding to the digital spacing information, and cross coupling connections in said control circuit means maintaining the predetermied directional movement of said stepping motor assuring continued spacing movement in the desired direction in response to intermittent supply of spacing information.

10. In a phototypesetting apparatus having means for projecting character images of different widths along a common path and a means for mounting photosensitive record material in an image plane of said projecting means for recording the images to produce lines of composition, the combination of spacer means operative to cause relative spacing movement between said common path and said mounting means, a stepping motor having an output member mechanically connected to said spacer means, a positive control member included in said motor and operative to change the position of said output member in digital fashion solely through the application of electrical force on said output member, means generating digital spacing information representing a desired spacing movement in terms of a position change between said mounting means and said common path, selectively operable circuit means directing such digital spacing information to said stepping motor to operate said spacer means through predetermined spacing movement increments in forward and reverse directions corresponding to the digital spacing information, and cross coupling connections in said circuit means assuring maintained spacing movement in the direction selected by operating said circuit means.

11. A spacer control operative to cause relative spacing movement between the common character image projection path and the record material mounting means in phototypesetting apparatus, comprising a spacer drive member, a stepping motor having an output member mechanically connected to said spacer drive member, a position control member included in said motor and operative to control and to change the position of said output member in digital fashion solely through the application of electrical force on said output member, means generating digital spacing information in the form of successive electrical pulses representing a total desired spacing movement in terms of a position change between the record material mounting means and the projection path, and binary control circuit means receiving said spacing pulses and connected to control the energization of said position control member sequentially to operate said spacer drive member through predetermined spacing movement increments corresponding to the sum of said pulses representing the digital spacing information.

12. A spacer control operative to cause relative spacing movement between the common character image projection path and the record material mounting means in phototypesetting apparatus, comprising a spacer drive member, a stepping motor having an output member mechanically connected to said spacer drive member, a position control member included in said motor and operative to change the position of said output member in digital fashion solely through the application of electrical force on said output member, means generating digital spacing information in the form of successive electrical pulses representing a desired spacing movement in terms of a position change between the record material mounting means and the projection path, binary control circuit means directing said spacing pulses successively to said stepping motor to operate said spacer drive member through predetermined spacing movement increments corresponding to the sum of said pulses representing the digital spacing information, and cross coupling connections in said control circuit means maintaining a predetermined sequential operation thereof assuring continued operation of said stepping motor in a predetermined direction.

References Cited by the Examiner
UNITED STATES PATENTS

| | | | |
|---|---|---|---|
| 2,475,497 | 7/49 | Harrold | 95—4.5 |
| 2,887,936 | 5/59 | Spievak | 95—4.5 |
| 3,088,388 | 5/63 | Iredopp | 95—31 |

NORTON ANSHER, *Primary Examiner.*

JOHN M. HORAN, *Examiner.*

UNITED STATES PATENT OFFICE
CERTIFICATE OF CORRECTION

Patent No. 3,183,806

May 18, 1965

Richard C. O'Brien et al.

It is hereby certified that error appears in the above numbered patent requiring correction and that the said Letters Patent should read as corrected below.

Column 4, line 71, for "leters" read -- letters --; column 8, line 37, for "Therefore." read -- Therefore, --; line 64, for "plug" read -- plus --; column 10, line 43, for "accompanied" read -- accomplished --; column 11, line 17, for "incluing" read -- including --; column 12, line 73, for "to rotate to" read -- to rotate in --; column 13, line 75, for "In a phototypesetting" read -- In phototypesetting --; column 14, line 21, for "comomn" read -- common --; column 16, line 49, for "predetermied" read -- predetermined --.

Signed and sealed this 7th day of December 1965.

(SEAL)
Attest:

ERNEST W. SWIDER
Attesting Officer

EDWARD J. BRENNER
Commissioner of Patents